July 22, 1941.                G. GORTON                 2,250,369
ANTIBACKLASH MECHANISM FOR ROTARY CUTTER SPINDLES OF MACHINE TOOLS
           Filed Nov. 30, 1939              2 Sheets-Sheet 1

Inventor
George Gorton
By Peck & Peck
Attorney.

July 22, 1941.  G. GORTON  2,250,369
ANTIBACKLASH MECHANISM FOR ROTARY CUTTER SPINDLES OF MACHINE TOOLS
Filed Nov. 30, 1939  2 Sheets-Sheet 2

Inventor
George Gorton
By Peck & Peck
Attorneys

Patented July 22, 1941

2,250,369

UNITED STATES PATENT OFFICE 2,250,369

ANTIBACKLASH MECHANISM FOR ROTARY CUTTER SPINDLES OF MACHINE TOOLS

George Gorton, Racine, Wis., assignor, by mesne assignments, to George Gorton Machine Co., Racine, Wis., a corporation of Wisconsin Application November 30, 1939, Serial No. 306,994

17 Claims. (Cl. 64—27)

This invention relates to certain improvements in anti-backlash mechanisms for the rotary cutter spindles of machine tools; and the objects and nature of the invention will be apparent to those skilled in the art in the light of the following explanations of the accompanying drawings that illustrate a preferred mechanical expression or embodiment of the invention from among other possible forms, modifications or arrangements within the scope of the invention.

The rotary cutter spindles of milling, die sinking, and other machines of substantially like characteristics, have a tendency to chatter or jump ahead under certain conditions due to backlash as a result of more or less slight looseness between the key or spline ways of the spindle and the complementary intermeshing key or keys of the rotary spindle driving member. This rotary or angular looseness is usually necessary for assembly and alinement purposes and to permit free sensitive longitudinal movements of the cuter spindle through the driving member during cutting operations. This rotary or angular looseness between the spindle and its rotary driving member is noted where the spindle is carried by its own radial and end thrust bearings, and is driven by a complementary concentric belt drive pulley carried by its own end and radial thrust bearings, to relieve the spindle of the side pull or strains of the belt on the pulley. In this last named arrangement, the spindle is usually formed with a multiplicity of longitudinal splines uniformly spaced or arranged around the circumference of the spindle, and the bore of the concentric pulley hub through which the spindle extends somewhat loosely is internally provided with correspondingly formed and spaced keys complementary to and loosely intermeshing with the spindle splines. For the reason heretofore pointed out, the pulley keys are angularly, rotatively or loosely intermeshed with the spindle splines. This angular looseness particularly tends to result in objectionable backlash or cutter jumps when the cutter of the rotating spindle is making final light finishing cuts which should accurately produce smooth surfaces in the work, whereas the cutter jumps due to backlash tend to produce wavy, uneven, or inaccurate finished surfaces in the work.

It is an object of my invention to provide improved mechanism readily assembled with the rotary cutter spindle and its drive, and comparatively simple in organization, for reducing to the minimum possibility of such objectionable cutter spindle backlash.

And a further object of the invention is to provide an effective anti-backlash mechanism for cooperative association with the rotary cutter spindle and its rotary driving member, for example, a belt drive pulley.

With the foregoing objects in view, as well as others developed by the following description, my invention consists in certain novel features, arrangements, constructions and combinations, as more fully hereinafter pointed out, and specified by the following claims.

In the drawings forming a part hereof, one embodiment of my invention is disclosed as an example, for purposes of explanation:

Fig. 1 shows in vertical central section, the upper portion of the cutter head of a vertical milling machine or the like, illustrating the upper portion of the longitudinally movable rotary cutter spindle, a pulley, for driving said spindle, and an embodiment of an anti-backlash mechanism of my invention, as an example, all arranged in or on said cutter head, the lower portion of the cutter spindle and its slide barrel or quill by which said spindle is carried and in which it is rotatably mounted, not being shown.

Figure 1:
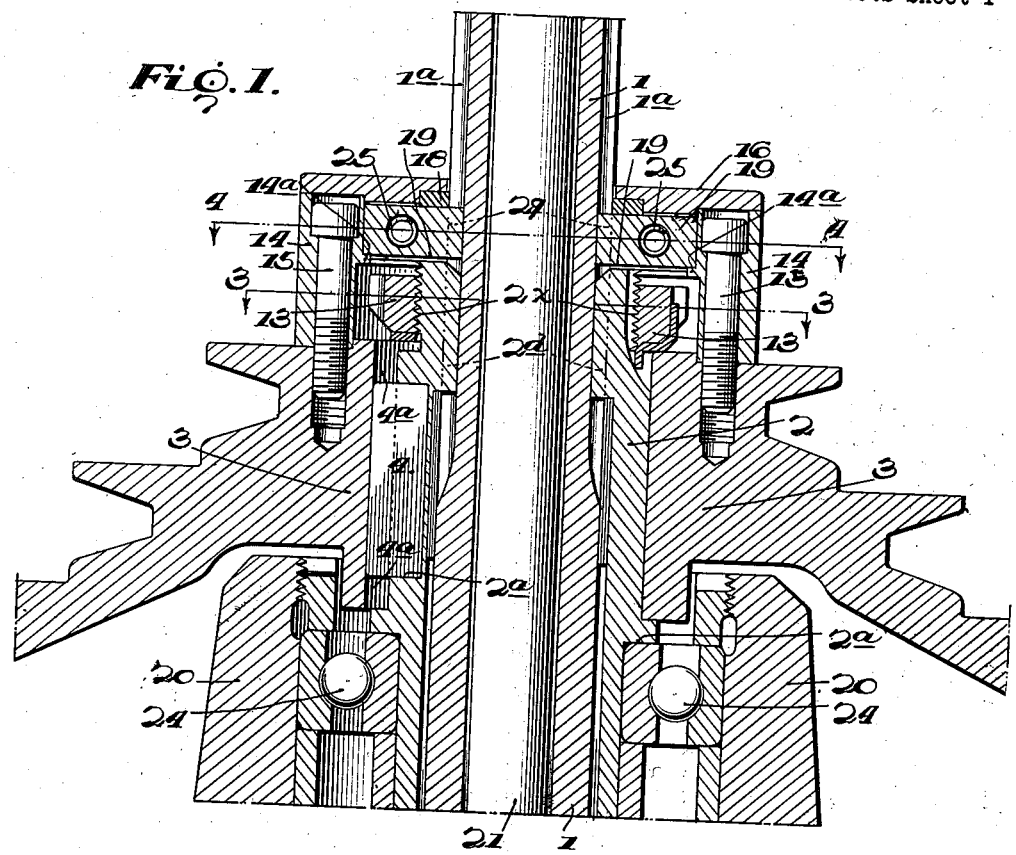
Figure 2:
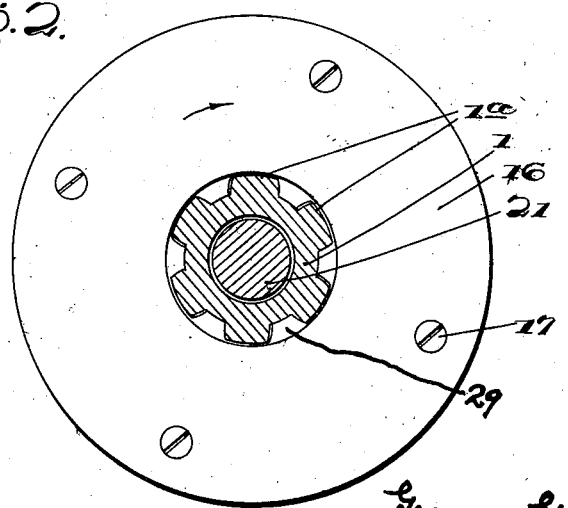
Fig. 2 is a detail top plan view, the rotary cutter spindle, and the collet drawer bar therein, that happens to appear in this particular spindle, being shown in cross section.
Figure 3:
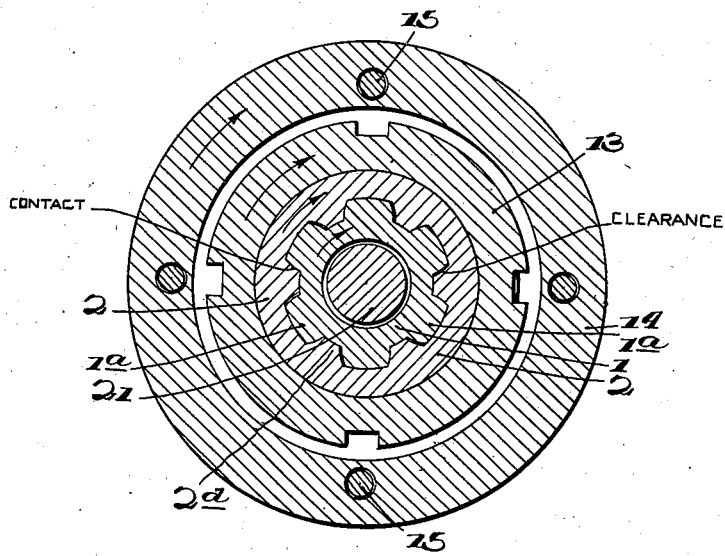
Fig. 3 is a detail cross section taken in the plane of the dotted line 3—3, Fig. 1.

Without intending to so limit my instant invention, it so happens, that the assembly of longitudinally movable cutter spindle, spindle driving pulley, and cutter head disclosed by the instant drawings, is substantially of the type disclosed by my Patent No. 1,889,653, of November 29, 1932, merely as an example for purposes of explanation.

The instant drawings disclose the upper annular end 20, of the supporting carrying cutter head.

The rotary longitudinally movable cutter spindle 1, extends longitudinally and centrally through the cutter head and at its intermediate portion (not shown) is usually rotatably mounted against radial and end thrust in a barrel or quill (not shown) slidable longitudinally in the cutter head, with the depending lower end of the spindle equipped with either a chuck or a collet (not shown) for replaceably securing the depending cutter (not shown) in and to the spindle. Where a cutter securing collet is employed, a suitable collet controlling draw bar 21, extends longitudinally through the cutter spindle. However, my present invention is not concerned with the presence or absence of such bar 21.

The rotary cutter spindle 1, in the example shown, extends upwardly a substantial distance above its said carrying slide barrel and above the cutter head, and is formed with one or more longitudinal keyways, for example I show a surrounding series of longitudinal splines 1a, uniformly-spaced to provide intervening longitudinal keyways. Corresponding longitudinal edge walls of the splines form abutments for simultaneous engagement by the keys of a driving member for rotating the spindle in one direction, say clockwise, while the opposite longitudinal edge walls of said splines form abutments for engagement by the complementary edges or faces of the keys of the driving member for rotating the spindle in the opposite direction, say anti-clockwise.

Any suitable rotary means or member, whether belt or otherwise driven, can be provided for driving the spindle through the medium of one or more of its keys or splines 1a. As an example of a drive for the cutter spindle, among others, that can be employed, I show a rotary driven member such as pulley 3, provided with and concentrically mounted on an elongated sleeve 2, concentrically surrounding and arranged longitudinally of an intermediate portion of the length of the cutter spindle 1, with this sleeve depending into the cutter head 20, and mounted therein for rotation and against radial and end thrust, as by ball bearings 24, or otherwise. The cutter spindle 1, is longitudinally movable within sleeve 2, while rotatable therewith. The pulley 3, is secured to rotate with sleeve 2, by key 4, fitting in keyway 4a, extending longitudinally throughout the length of the pulley hub, for assembly and disassembly purposes. The pulley hub, has a longitudinally slidable fit on the exterior of sleeve 2, and is clamped to said sleeve by screw threaded nut 13, meshing with the exteriorly screw threaded upper end 2x, of said sleeve, and screwed down on the upper end of said hub, to clamp the lower end of said pulley hub against the annular upwardly facing exterior shoulder 2a, of sleeve 2. Thus, the pulley 3, and sleeve 2, in this example, are normally fixedly united, and the sleeve becomes, in effect, the pulley hub or internal bushing, to constitute the cutter spindle driving sleeve.

The sleeve 2, preferably at its upper end portion, is internally formed with longitudinal splines or keys 2d, and intervening keyways substantially corresponding with and complementary to the splines 1a, of the rotary cutter spindle, with said keys 2d, providing abutment surfaces at their longitudinal edges, and more or less loosely intermeshing with said splines 1a, and the abutment faces provided by their opposite longitudinal edges, in rotary driving relation. For original assembly and alinement purposes and for other reasons, it is desirable, that the transverse arcuate width or length of each key 2d be slightly less than the transverse arcuate length or width of each keyway between the splines 1a, or vice versa, with the result, that when thus assembled there will be relative slight rotary or angular lost motion or looseness between the spindle driving member and the driven cutter spindle and resulting possibility of objectionable backlash.

Various organizations have been heretofore employed in an effort to prevent such cutter spindle backlash, during cutting operations, but such old organizations did not attain the desired results and efficiency, particularly under high speed and heavy duty conditions. These old anti-backlash organizations failed to attain the desired efficiency under all conditions, particularly where the driven working cutter spindle must be freely sensitively longitudinally feedable or movable through its driving member, because of the total dependency of such organizations on the more or less unpredictable and uncertain propelling action of substantially uncontrolled springs, subject to the action of centrifugal and other forces during high speed and heavy duty work.

The instant disclosure constitutes one example embodiment of my successful solution of this anti-backlash problem, wherein I provide abutment or stop means for positively limiting and predetermining the relative angular forward movement of the spindle-holdback device or element (the non-driving member) carried by the spindle driving member and relatively angularly movable with respect to said driving member and the spindle, and loosely splined to the spindle and arranged to act on the rotating spindle to hold its key or splines back in driven relation to the advancing driving key or splines of the spindle driving member; with said abutment means operatively connecting said spindle driving member and said relatively movable holdback device or element, and rendered settable with respect to said driving member for varying and predetermining the positive limit of the forward relative movement of said holdback device or element, and with said abutment means, if so desired including spring means tending to yieldable press said holdback device or element relatively backwardly with respect to said driving member to press the cutter spindle backwardly with its splines in driven contact with the splines of the driving member.

Without intending to so limit all features of my invention, I have provided a housing or casing upstanding from the upper end of and normally-fixed with respect to the spindle driving member 3. In the particular example disclosed, this casing includes an upstanding rigid ring or annulus 14, clamped down on the upper end of rotary spindle driving member 3, by screw bolts 15, or by any other suitable means, and a cap or cover plate 16, secured on the upper end of ring 14, as by screws 17. This cover plate is provided with a central vertical opening through which the upwardly extending splined portion of the cutter spindle 1, loosely passes. If so desired, a felt washer 18, can be employed around the cutter spindle at the central under side of the cover plate to substantially seal said plate opening.

The casing thus formed by said ring and its cover plate, is secured to and rotates with the spindle driving member, and encloses the driving member clamping nut 13, and the internally-splined or key-forming upper end of the sleeve 2, driven by and keyed to the member 3. In this particular example, the casing is preferably so formed and arranged as to internally provide an annular space surrounded by wall 14, and located between the cover plate 16, and the top annular faces of the supper ends of nut 13, and tube 2, and surrounding and concentric with the splined portion of the cutter spindle 1, that vertically traverses said annular space. In this particular example, this annular space is preferably provided for the reception of the hereinbefore mentioned holdback device or non-driving normally relatively movable constant member that, preferably under constant spring pressure, acts to press the cutter spindle splines back in close contact with the spindle-driving keys or complementary splines of the tube 2, and to resist forward jumping or advancing therefrom the distance otherwise possible by reason of the angular rotary slack or looseness between the intermeshing splines or keys of the spindle and the tube that is a part of the driving member 3. In this particular example, said non-driving member is disclosed in the form of a flat disk 19, arranged in said annular space concentrically with respect to the casing ring 14, and the spindle 1, and preferably resting on and upheld by an annular internal ledge 14a, rigid with the casing ring 14 (Fig. 1).

The disk member 19 is preferably upheld as by said ledge 14a, from contact with the upper ends of nut 13, and tube 2, with the top face of said member in contact with felt washer 18. The disk member 19, is mounted for relative sliding or movable contact with its upholding ledge 14a, and the casing ring 14. The number 19, is splined or keyed to the rotary cutter spindle to permit longitudinal movement of said spindle through said member. For instance, member 19, can be provided with one or more keys rigid therewith and extending radially into the opening therethrough, to cooperate with the splined portion of said rotary cutter spindle in taking up the slack or looseness between the splines 1a, and the keys or splines 2d. However, I prefer to form said member 19, with a circumferential series of uniformly spaced rigid splines 29, around its central opening that are complementary to and that loosely mesh with the splines 1a, of the rotary cutter spindle, approximately to the same extent that the driving splines 2d, loosely intermesh with and are complementary to the driven splines 1a, of the cutter spindle.

Means are provided whereby, through the medium of a relatively movable hold back device, for example disk 19, the degree or extent of the angular or rotary looseness or lost motion between the intermeshing splines of rotary cutter spindle 1, and driving member 3, can be positively predetermined, varied, reduced or eliminated.

For example, such "means," can comprise any suitable abutment or stop carried by the driving member 3, and settable therein toward and from a complementary cooperating stop or abutment portion or fixed surface of the holdback device, for example, disk 19, to limit the relative angular forward movement of the holdback disk with respect to the forward rotation of the driving member 3. The purpose being to positively limit such relative forward movement while substantially maintaining the holdback disk at its limit of relative backward movement holding back the rotating cutter spindle with its splines in operative contact with the splines of the forwardly rotating driving member 3.

In the particular example illustrated, the circumferential portion of disk 19, provides a rigid face or abutment surface 27, substantially tangent to the axis of rotation and forwardly facing in the direction of disk rotation. In this example, the complementary abutment carried by and rotating with driving member 3, is shown in the form of an elongated exteriorly longitudinally screw threaded rod or screw 22, threaded and longitudinally settable through a screw threaded hole piercing wall 14, with the longitudinal axis of said screw substantially perpendicular to the plane of abutment face 27, and with its inner end in front of and in operative abutting or limiting relation to said face. The screw through the medium of its accessible outer end, can be rotated to set its inner end inwardly any desired distance toward abutment surface 27, to force the disk 19, relatively backward even to such an extent as to clamp the spindle splines against the driving member splines, and thus virtually lock the spindle against longitudinal feed movements through member 3, thus eliminating all lost motion between said splines.

The inner end of the longitudinally settable abutment 22, thus, through the medium of the abutment face or portion 27, of holdback device, such as 19, fixes the limit of relative angular forward movement of the device 19.

In normal cutting operations, the rotating cutter spindle should be freely longitudinally movable through its driving member 3, and the holdback device 19; hence, the longitudinally settable abutment 22, if in its inwardly advanced position virtually locking the cutter spindle to the driving member 3, against free longitudinal movements, should be unscrewed to carry its inner end outwardly a very slight distance, to afford the necessary very slight clearance between the intermeshing spindle and member splines to permit free relative longitudinal spindle movements.

The abutment 22, when thus slightly adjusted, will then remain in a position constituting a positive stop against such relative forward movement of the holdback 19, as will result in objectionable looseness, thereby reducing possibility of backlash to the minimum, because the slight looseness then permitted is only that necessary for free relative longitudinal movement of the cutter spindle.

In the embodiment shown merely as a preferred example, the head 23', functions as the inner abutment end of abutment member 22, in cooperating with the complementary abutment 27, of the holdback device 19, and in any event, said member 22, and holdback device, function as hereinbefore described whether or not abutment head 23', is part of member 22, or a part of plunger 23, and whether or not plunger 23 and spring 25, are one or both present or absent.

Figure 4:
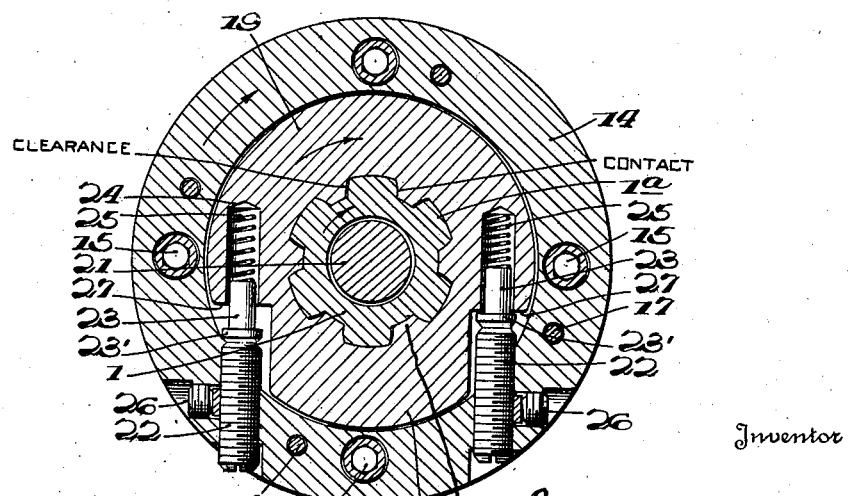
Fig. 4 is a detail cross section taken in the plane of the dotted line 4—4, Fig. 1, the parts of the anti-backlash mechanism being set or adjusted for right hand or clockwise rotation of the cutter spindle.

The member 22, and abutment face 27, at the lower right hand portion of Fig. 4, (as hereinbefore described) are substantially arranged for clockwise rotation of the cutter spindle and its driving member. For a cutter spindle and its drive intended for anti-clockwise rotation, the member 22 and abutment face 27, should be arranged substantially as disclosed at the lower left hand portion of Fig. 4.

Where the cutter spindle and its drive are adapted for rotation both clockwise and anti-clockwise, I provide both sets of abutment means whether or not springs and plungers are employed, say, arranged as shown by Fig. 4, without intending to so limit my invention, one set for use with clockwise rotation, and the other set for use with anti-clockwise rotation.

In Fig. 4, the lower right hand abutment 22, is adjusted, for clockwise rotation of the cutter spindle and its drive, to closely limit the relative forward movement of holdback device for only such clearance as necessary for free relative longitudinal movement of the cutter spindle. The lower left hand abutment member 22, Fig. 4, is shown withdrawn outwardly from normal operative position, to offer no resistance against relative backward movement of the clockwise rotating holdback device 19.

For anti-clockwise rotation, of the cutter spindle, the lower right hand abutment member, Fig. 4, will be adjusted to substantially to the present position of the left hand abutment member 22, while said left hand member will be adjusted to substantially the present position of the right hand member.

While not intending to so limit all features of my invention, I prefer to gain certain added function resulting from the employment of means between each settable abutment means and the holdback device, for example disk 19, whereby the holdback device is subjected to, more or less controllable, backward-impelling spring tension.

Thus, in the example illustrated, the holdback member 19, is formed with circumferential notches to provide the opposing rigid abutment faces 27, and the outer open end of a longitudinally elongated spring socket 24, in said member, opens through each face.

Each such socket, more or less loosely and longitudinally receives a coiled expansion spring, at its inner end seated against the closed inner end of the socket. The outer ends of the springs are subject to the opposing or compressing action of the settable abutments 22, if so desired, through the medium of longtudinally slidable spring plungers 23, longitudinally arranged in the sockets and interposed between the respective springs and their respective complementary abutments 22, with each socket, spring, and abutment, so arranged that the tension of the compressed spring exerts backward propelling-spring tension on the forwardly rotating holdback device 19.

In the particular example illustrated, without intending to so limit the invention, each longitudinally settable abutment member 22, is provided with a clamping screw 26, for locking the member in set position after each adjustment thereof.

The example of an embodiment of the instant invention, disclosed, can be applied to and removed from existing cutter spindles and drive mechanisms, as a unit or otherwise, as the housing 14, 16, carries the cutter spindle holdback member 19, and its holdback pressure spring mechanism where employed, as well as the positive settable abutment means. Thus, the anti-backlash mechanism, can be slipped down on the splined cutter spindle, and secured to the upper end of the spindle driving member 3, by screws 15, or otherwise. The unit can be as easily removed for repair, adjustment or replacement.

However, I do not wish to limit all features of my invention to a replaceable unit wherein the casing carries or is removable with the annular, ring-like member 19, as such member can be otherwise operatively assembled with the driving member or other carrier to function as hereinbefore described reducing to the minimum cutter spindle backlash, whether the driving intermeshing connection between the driving member and the spindle includes one or more keys and keyways and whether or not the intermeshing connection between the cutter spindle and the anti-backlash mechanism, for example disk 19, consists of one or more keys and keyways, or surrounding series of intermeshing splines.

While I do not wish to so limit all features of my invention, from a specific standpoint, I gain material advantages where the illustrated example embodiment is employed, by applying the angular holdback anti-backlash force or pressure to substantially each one of the surrounding series of splines of the advancing rotating cutter spindle, that are contacted by the keys of the spindle driving member, in such manner that said holdback pressure is applied to and distributed against substantially all of the cutter splines completely around the circle thereof, preferably, by the direct holdback contact of keys or the like rigid with a holdback device that rotates with the spindle but does not normally perform spindle advancing driving functions.

The foregoing disclosure is for purposes of explanation and not for purposes of limitation, as various changes, modifications and adaptations can be resorted to without departing from the spirit and scope of the following claims.

What I claim is:

1. In an organization that includes a rotary cutter spindle and a rotary spindle-driving member loosely keyed thereto for relative longitudinal movements; anti-backlash mechanism that includes a holdback device rotating with said member and angularly relatively movable forwardly and backwardly with respect thereto, said device being loosely keyed to said spindle to normally relatively hold back the rotating spindle in driven relation to the advancing driving member; and abutment means operatively extending from said member to said device for limiting the relative angular forward movements of said device with respect to said rotating member, said abutment means including an abutment moving with said driving member and a complementary abutment carried by said device, one of said abutments being settable with respect to the other abutment to vary and predetermine said limit of relative forard movement of said device.

2. In an organization having a rotary cutter spindle and a rotary driving member loosely splined to said spindle and arranged for relative longitudinal movements; anti-backlash mechanism comprising a spindle holdback device loosely splined to said spindle and rotating with said member and associated therewith for relatively angular backward and forward movements; and means for positively limiting the relative forward movements of said device with respect to said member, said means comprising a normally stationary stop with which said rotary driving member is provided, settable with respect thereto toward and from said device, said device having a portion in cooperative relationship to said first named stop.

3. In an organization comprising a rotary spindle and a rotary member arranged concentrically on and loosely splined to said spindle, for free relative longitudinal movements; anti-backlash mechanism comprising a holdback device rotating with said member and associated therewith for relative angular backward and forward movements and loosely splined to said spindle; and means establishing a normally stationary variable limit for the relatively forward movements of said device, said means including stop means cooperatively associated with said device to limit its said forward movements, said stop means being propelled by said member and settable with respect thereto to vary its operative limiting position with respect to said device.

4. In an organization comprising a rotary spindle and a rotary member arranged concentrically on and loosely splined to said spindle, for free relative longitudinal movements; anti-backlash mechanism comprising a holdback device rotating with said member and associated therewith for relative angular backward and forward movements and loosely splined to said spindle; and means in cooperative relationship with both said device and said member, including a settable normally-fixed positive stop limiting the relatively forward movements of said device, and whereby said movements can be decreased or increased.

5. In an organization comprising a rotary spindle and a rotary member arranged concentrically on and loosely splined to said spindle, for free relative longitudinal movements; anti-backlash mechanism comprising a holdback device rotating with said member and associated therewith for relative angular backward and forward movements and loosely splined to said spindle; and means providing a stop in cooperative association with said device to limit the relatively forward movements thereof, said stop forming a part of said member and settable with respect thereto and said device to vary and predetermine the length of said forward movement of said device.

6. In an organization comprising a rotary spindle and a rotary member arranged concentrically on and loosely splined to said spindle, for free relative longitudinal movements; anti-backlash mechanism comprising a holdback device rotating with said member and associated therewith for relative angular backward and forward movements and loosely splined to said spindle; and means establishing a normally-stationary limit for the relatively forward movements of said device, said means including a stop carried by said member and settable with respect thereto to increase, decrease or substantially eliminate said range of relative forward movements of said device.

7. In an organization comprising a rotary spindle and a rotary member loosely splined to said spindle, said spindle and member arranged for rotation together either clockwise or anti-clockwise; anti-backlash mechanism comprising a spindle holdback device substantially annular in form and loosely splined to said spindle and rotatable with said spindle and said member and associated with said member for relative angular forward and rearward movements to hold back the spindle with respect to the member when the direction of rotation is either clockwise or anti-clockwise; means for positively limiting the relative forward movement of said device when the rotation is clockwise, said means being settable for substantially increasing the range of said relative movement of said device for anti-clockwise rotation of said spindle and member; and other means for positively limiting the relative forward movement of said device when the rotation is anti-clockwise, said other means being settable for substantially increasing the range of said relative movement of said device for clockwise rotation of said spindle and member.

8. A rotary spindle member and a rotary annular member substantially concentrically arranged on and loosely splined to said spindle member for rotation together and for relative longitudinal movements, in combination with anti-backlash mechanism comprising a holdback device operatively connecting said spindle member and annular member to substantially take up the looseness between their intermeshing splines, said device being carried by and normally relatively angularly movable forwardly and backwardly with respect to one of said members; said device providing an abutment carried thereby; and a normally stationary abutment element adjustably carried by said last mentioned member and providing an abutment opposing said abutment of said device, for the purposes substantially as described.

9. A rotary driven cutter spindle, and a rotary driving member for and loosely splined to said spindle, for relative longitudinal movements, in combination with anti-backlash mechanism comprising a spindle holdback annulus loosely splined to the spindle and relatively angularly movable forwardly and backwardly with respect to said member; and means for holding said annulus back substantially at its limit of angular relative backward movement with respect to the direction of driving member rotation and for limiting the relative forward movement of said annulus, said means including an abutment element movable with said driving member and settable with respect thereto, and an opposing abutment carried by said annulus and cooperatively arranged with respect to said abutment element.

10. Anti-backlash mechanism, in or for application to, an organization of a rotary spindle, and a rotary member substantially arranged concentrically on said spindle and splined thereto for simultaneous rotation therewith and for relative longitudinal movements; said mechanism comprising a substantially surrounding wall for securing to said member, an element carried by said wall and loosely splined to said spindle, said element being angularly relatively movable backwardly and forwardly with respect to the direction of rotation of said wall when applied to said member; and means operatively connecting said wall and said element for limiting the relative forward angular movement of said element and for normally holding said element relatively backwardly to substantially take up the slack between the meshing splines of the rotating spindle and member, said means including an adjustable abutment screw threaded through said wall.

11. Anti-backlash mechanism, in or for application to, an organization of a rotary spindle, and a rotary member substantially arranged concentrically on said spindle and splined thereto for simultaneous rotation therewith and for relative longitudinal movements; said mechanism including a carrier for securing to said member; a spindle-holdback approximately-annular device rotating with said carrier, and adapted to be loosely splined to said spindle, and angularly relatively movable with respect to said carrier; and means for normally substantially maintaining said element relatively angularly backwardly with respect to the direction of forward rotation of said carrier and member to substantially take up the slack between the meshing splines of the spindle and member, and for establishing a variable limit for the relatively angular forward movement of said element, said means including a stop carried by said element and facing forwardly in the direction of rotation, an accessible abutment member carried by said carrier and settable toward and from said stop.

12. In combination; a rotary spindle member;

a rotary member concentric with and loosely splined to said spindle member, for driving one of said members by the other member either clockwise or anti-clockwise, and for relative longitudinal sliding movements; an element surrounding and loosely splined to the spindle member and rotatable with the driving member and mounted for limited relative annular clockwise and anti-clockwise movements with respect to said driving member; spring means between said driving member and said element for pressing said element toward its limit of relative angular clockwise movement; other spring means between said driving member and said element for pressing said element toward its limit of relative angular anti-clockwise movement; each of said spring means including a settable spring-pressure-controlling and abutment-forming member carried by said driving member.

13. Anti-backlash mechanism for a rotary spindle having a rotary member thereon and loosely keyed thereto to rotate with the same in either direction, comprising a spindle-holdback annulus loosely keyed to the spindle and rotatable with and relatively movable with respect to said member backwardly and forwardly; spring means normally yieldingly acting to press said holdback annulus in an anti-clockwise direction while said spindle and member are rotating clockwise, means for controlling and relieving the backward tension of said spring means on said holdback annulus; another spring means for yieldingly pressing said holdback annulus in the opposite direction from that in which said first mentioned spring means acts on said annulus, when said spindle and member are rotating anti-clockwise, and means for controlling and relieving the tension of said last mentioned spring means on said holdback annulus.

14. A rotary driven cutter spindle, and a rotary driving member for and loosely splined to said cutter spindle and arranged for relative longitudinal movements between the spindle and member, in combination with anti-backlash mechanism comprising a spindle holdback device loosely splined to said spindle and associated with said driving member for relative angular forward and backward movements; and means for holding said device backwardly substantially to its limit of angular relative movement in opposition to the direction of forward rotation of said member, said means including an abutment operatively associated with said holdback device to limit its relative forward movement, said abutment being carried by said member and adjustable with respect thereto toward and from said holdback device, and an expansion spring operatively arranged between said abutment and said holdback device to exert tension tending to press said holdback device rearwardly under the control of said abutment.

15. A rotary driven cutter spindle, and a rotary driving member for and loosely splined to said spindle, in combination with anti-backlash mechanism comprising an element rotating with said member and substantially concentric with and loosely splined to said spindle and relatively angularly movable forwardly and rearwardly with respect to said driving member, and means for holding said element backwardly relatively to the forward rotation of said driving member, said means including an abutment member operatively associated with the element to limit its forward movements relatively to the driving member, said abutment member moving with said driving member, said element being provided with and carrying a relatively movable spring pressed abutment complementary to and opposing said abutment member, said abutment member being settable with respect to said spring-pressed abutment.

16. A rotary spindle member and a rotary annular member substantially concentrically arranged on and loosely splined to said spindle member for rotation together and for relative longitudinal movements, in combination with anti-backlash mechanism comprising a holdback device operatively connecting said spindle member and said annular member to substantially take up the looseness between the intermeshing splines of said spindle and annular members, said device being carried by and normally relatively angularly movable forwardly and backwardly with respect to one of said members; said device providing an abutment carried thereby; a normally stationary abutment element adjustable with respect to and carried by said last mentioned member and providing an abutment opposing said abutment of said device, and spring means to exert backward-propelling-pressure on said device, said abutment element being operatively arranged with respect to said spring means to control the device-propelling pressure thereof.

17. Anti-backlash mechanism for a rotary cutter spindle having its rotary driving member loosely keyed thereto for relative longitudinal spindle movements, said mechanism comprising a spindle-holdback member loosely keyed to said spindle, and rotatable with said driving member and relatively angularly movable forwardly and backwardly with respect thereto, said holdback member providing a stop carried thereby, and a spring socket arranged substantially tangentially of the spindle axis; an expansion spring seated in said socket to exert rearward propelling tension on said holdback member; said driving member being provided with abutment means; and a spring plunger operatively arranged between said abutment means and said spring, said abutment means being settable to predetermine and vary the limit of relative forward angular movements of said holdback member.

GEORGE GORTON.